ated Nov. 7, 1961

3,007,867
THIXOTROPIC HIGH TEMPERATURE THREAD
LUBRICANT CONTAINING SILVER FLAKES
Lloyd R. Allen, Belmont, and Dudley H. Woodard, Cambridge, Mass., assignors, by mesne assignments, to Kenmore Research Company, Framingham, Mass., a corporation of Ohio
No Drawing. Filed June 1, 1956, Ser. No. 588,627
13 Claims. (Cl. 252—26)

This invention, relating as indicated to a high temperature thread lubricant, is particularly directed to a lubricant for closely fitted parts, i.e., threads, keyways, and the like, of stainless steel, titanium, high temperature alloys or other metals that may be subjected to temperatures ranging from 500° F. to 2100° F. Of course, the metals must be able to withstand these temperatures without appreciable creep at the stresses used.

Principally, this thread lubricant comprises a thixotropic, non-melting lubricant material formed from a castor oil base, although other materials may be used, and a modified clay base thixotropic gelling agent comprising material such as Bentone 34 and acetone, having mixed therein significant quantities of particles of silver, aluminum, magnesium oxide and ceramic balls, including glass or quartz balls, in various mixtures.

An object of this invention is to produce a new and improved high temperature lubricant which may be put on the threads to aid in sealing and still permit easy removal of the mated or threaded parts after the fittings and the like have been subjected to high temperatures.

A further object of this invention is to produce a new and effective combination of materials which may provide better and easier removal of threaded fittings and couplings after being subjected to high temperatures, thereby reducing furnace friction and galling.

As background for this problem, it should be mentioned that surface galling of threaded parts is a difficult problem, particularly when fittings of stainless steel or other materials mentioned above have been subjected to high take-up pressures. In such cases, they are inclined to weld and gall at the interface, and the fittings are ruined and cannot be disassembled after being exposed to the temperatures for which they are designed.

It should be understood that the surfaces of machined materials have thereon projections or asperites and, as two metals slide over one another, these asperites tend to weld to each other as interface pressures increase. After initial welding at the surface, further movement tends to tear these asperites out of one of the surfaces. This generates an instantaneous surface temperature, which is of the order of several thousand degrees Fahrenheit. As a result, there is a point-to-point melting of the asperite surface. In addition, of course, virgin metal is left on one of the surfaces. By virgin metal we mean that there is no oxide layer on the surface. The cohesive force between these virgin metal surfaces is of a very high order of magnitude, and it is this which is the main source of surface friction. Of course, it should be understood that when two surfaces move over each other, they do not completely weld together, but rather the peaks of the asperites do weld and come in contact. The result is a gradual attritioning of the level of the asperites. This means that the surface is gradually wearing smoother.

Through diffusion and pressure at high temperatures, there is bound to be asperite welding. Our lubricant contains materials which will cover these virgin surfaces when exposed in disengagement or take down. For example, silver and magnesium oxide serve to reduce welding of the newly exposed or virgin surfaces.

Another object of this invention is to reduce the diffusion of metal layers. This effort at slowing down diffusion at high temperatures is accomplished by the interposition of a metal on the surfaces. In any diffusion reaction, there is an exchange of the atomic position, i.e., the atoms go from layer A to layer B, the direction of diffusion depending on several variables. This results in a gradual welding of the surfaces. If one can put a layer in between them, i.e., a barrier layer, which will slow down this diffusion, this will, in turn, decrease the amount of welding at high temperatures. Furthermore, it is essential that this barrier layer, and we will arbitrarily call it layer D, should have a slow rate of diffusion into layers A and B, and vice versa. With the lapse of considerable time or as a result of high temperatures, the barrier layer will contain atoms from layers A and B. To accomplish this action, we discover that silver was one of the best metals available because of the low diffusion rate of silver into ferrous materials and the immiscibility of silver with molten stainless at the asperite point.

It must also be realized that silver itself serves as a lubricant on the take-up of the threads because the shear stress of silver is low, and because the silver particles are themselves in the form of flakes which tend to slide over each other. Once pressure welding of the threads has been caused by heating to the specified temperature, possibly 1900° F. or as high as 2500° F., the bond must be broken. The low shear stress of silver lends itself to this. In practice, of course, usage might be up to these temperatures where the welding would occur. The metal threaded part is returned to normal room temperature, and the bond that has been set up by the thermal exchange at high temperatures by diffusion and oxidation must be broken. A material whose shear strength is low is silver, and it solves this problem well. In addition to having low shear stress, it is isotropic. By isotropic we mean that it does not have directional properties. The property of isotropy is desirable, but not essential, i.e., it is also important to consider miscibility or diffusion rates, and these are important factors. Earlier, the shear stress was important in that it was necessary to have a certain attritioning of the asperites, and the low shear stress aided in this.

In addition to the silver, aluminum and magnesium oxide particles which are suspended in the modified clay base thixotropic gelling agent and castor oil, there is employed ceramic balls, i.e., various mixtures of glass and quartz balls, as spacer elements.

The reason why a non-melting thixotropic gel is employed together with the silver is that the gel is placed between two metal surfaces to be protected from galling when the bond is severed in the removal of parts, such as threaded parts. These surfaces must be protected from galling under heat during the heating up cycle, i.e., when the temperature is raised within the range of 500° to 2300° F. Normal greases or oils would tend to flow out, carrying the silver particles and other materials, such as the ceramic balls, with them, but because this is a non-melting and a thixotropic gel it is not affected by heat in so far as position goes and the final result is to boil the oil or gel dry in situ, leaving silver and the ceramic balls in position.

The other function of the thixotropic gel is to insure that over a long period of time the heavy silver particles do not settle to the bottom, thus rendering a portion from the top different in composition than a portion from the bottom of the container, that is to say, the product, when made with a thixotropic gelling agent, has good shelf life.

Another reason why silver is used is that silver melts but it has a very low shear stress and breaks loose easily. It is desirable in this connection to have a material which will break and start flowing. When the gel and silver mixture is heated to a high temperature, the gel is destroyed, leaving a residue and the silver particles.

Any oxide which may form from the metal surfaces is disturbed in its growth by the residue from the various components. In practice, there is not enough residue from the components, such as the thixotropic gelling agent and the castor oil, so that additional amounts of material, such as magnesium oxide, are used to provide a serious disturbance of such growth, thus providing an easier fracture pattern or a manner in which the bond may be broken or severed.

In the process of growing from the metal surfaces, the oxide layers push before them the major portion of the silver and magnesium oxide so that they never grow together, but grow around a very rich layer of silver and magnesium oxide. It is along this layer that fracture occurs.

It has happened, however, that there is insufficient clearance between two tightly fitting parts in threaded surfaces or a keyway so that insufficient silver and magnesium oxide can be maintained in place under usual assembly operations so that to guarantee a certain minimal amount of clearance being present between the two surfaces, additional inert or non-reactive particles, particularly spherical particles, are used therebetween. As an example of these particles, we may use ceramic or glass balls. These particles function as a spacer to guarantee a thin layer containing enough silver and magnesium oxide to allow an easy fracture pattern and hence fracture is established to permit the silver to act as a lubricant on take down of the threaded parts.

As examples of these lubricants, we intend to use a lubricating fluid and a modified clay base thixotropic gelling agent sufficient to gel the same, together with silver flake below 200 mesh from 10 to 30 percent of the mixture. The gelling agent would be possibly from 1 to 10 percent of the mixture, though it is preferred to use 7 to 8 percent, and the balance would be a lubricating fluid. In addition to the above, non-reactive balls from 1 to 20 microns in size would be employed, though the preferred size is 5 to 10 microns. As examples of these balls we may include ceramic materials such as glass, quartz, aluminum oxide, heavy fused magnesium oxide, thorium and cerium sulfide. It will be understood, of course, that the particles need not be perfectly spherical. In addition to this, we can use magnesium oxide from 1 to 20 percent of the mixture, preferably from 2 to 5 percent.

An example of this compound is given below:

| | Percent |
|---|---|
| Bentone 34—thixotropic gelling agent | 8 |
| Silver flakes | 15 |
| Balls (5 microns—size) | 5 |
| Magnesium oxide | 3 |

Balance is castor oil with sufficient acetone to gel— see Bentone Handbook (National Lead), 1953, page 8.

From the foregoing description it will be apparent that this thixotropic lubricant, particularly a thread lubricant, employs the lubricant together with the silver particles and the gelling agent. The necessity and explanation of said components is very apparent from the foregoing. However, it may not be understood exactly why magnesium oxide is employed.

Magnesium oxide is being used in this layer to make the rupture of the oxide film formed at high temperature easier. Magnesium oxide has a very low bulk density and provides low shear stress in the bond layer to all threads to strip and rupture the bond when being removed. It also serves as a barrier for inter-diffusion between parts and as a mechanical barrier. When oxides are formed within the closely fitting parts, such as threads, keyways and the like, the oxide layers of materials of the iron group as well as the high temperature metals, are broken easier when magnesium oxide is added. By this combination of metals, we mean iron, cobalt and nickel and such materials as chromium, tungsten, titanium and the like.

In this connection it is particularly desirable to use precipitated magnesium oxide of very low bulk density. One particular advantage of magnesium oxide is that on the lower temperature side of the range from 500° to 2300° F., it is particularly effective. At the higher temperatures sufficient oxides are formed from the metals of the group that these oxides rupture and form a particulate layer to permit the breaking away of the threads. The contribution of magnesium oxide is best felt when the fittings are raised to the general region of 1200° to 1500° F. Magnesium oxide is not an essential component of the combination but aids in providing these additional advantages.

As to the thixotropic gelling agents, we prefer the modified clay base materials known as organophilic clay thickeners or gelling agents. These include base clays of bentonite, montmorillonite, forms of which are taught in the Bentone Handbook (Nation Lead) and in the Hauser Patent No. 2,531,427. The characteristics of these particular gelling agents are that they are non-melting and thixotropic. In general, the product used has been Bentone 34 which has been used with acetone or methyl alcohol, linseed oil or castor oil. Alcohol has been used when it is desired to leave a residual silver layer not containing carbon. Other fluids, however, both organic and inorganic, may be employed for the lubricating fluid in place of the principal ingredient that has been used, such as castor oil. However, these other fluids may not be water base.

In connection with the examples, acetone would be used with the Bentone product in a sufficient amount to aid in gelling, and, for example, 40 percent to 60 percent of the Bentone might be acetone.

Under some conditions zinc oxide may be used in place of the magnesium oxide.

This invention may be embodied in other specific forms without departing from the spirit or essential characteristics thereof. The present embodiments and examples are, therefore, considered in all respects to be illustrative and not restrictive, the scope of the invention being indicated by the appended claims rather than by the foregoing description, and all changes which come within the meaning and range of equivalency of the claims are, therefore, intended to be embraced therein.

We claim:

1. A high temperature thread, anti-galling composition consisting essentially of a major proportion of lubricating fluid thickened to a thixotropic gel with an organophilic clay and containing from about 10 to 30 percent of silver flakes, 1 to 20 percent of magnesium oxide, and 1 to 10 percent of non-reactive, ball-shaped, ceramic particles having a particle size of 1 to 20 microns.

2. The composition of claim 1 further characterized in that the ceramic particles are glass.

3. The composition of claim 1 further characterized in that the ceramic particles are quartz.

4. The composition of claim 1 further characterized in that the ceramic particles are aluminum oxide.

5. The composition of claim 1 further characterized in that the ceramic particles are heavy-fused magnesium oxide.

6. The composition of claim 1 further characterized in that the ceramic particles are cerium sulfide.

7. The composition of claim 1 further characterized in that the ceramic particles are thorium sulfide.

8. The composition of claim 1 further characterized in that the magnesium oxide ranges from about 2 to 5 percent.

9. The composition of claim 1 further characterized in that the magnesium oxide ranges from about 2 to 10 percent and the ceramic particles range from about 2 to 5 percent.

10. A high temperature thread, anti-galling composition consisting essentially of a major proportion of lubricating fluid thickened to a thixotropic gel with an organophilic clay and containing from about 10 to 30 percent of silver flakes, 1 to 20 percent of magnesium oxide, and 1 to 10 percent of non-reactive, substantially-spherical, powdered ceramic particles.

11. A high temperature, thixotropic thread lubricant consisting essentially of a major portion of lubricating fluid thickened with an organic onium-bentonite gelling agent and containing from 10 to 30 percent of silver flakes, 1 to 20 percent of magnesium oxide, and 1 to 10 percent of non-reactive ball-shaped, ceramic particles having a particle size of 1 to 20 microns.

12. The lubricant of claim 11 further characterized in that the silver flakes are of a particle size that will pass through a 200 mesh screen.

13. The lubricant of claim 12 further characterized in that the silver flakes range from about 15 to 25 percent.

References Cited in the file of this patent

UNITED STATES PATENTS

| | | |
|---|---|---|
| 1,700,101 | Smith | Jan. 22, 1929 |
| 2,065,247 | Smith | Dec. 22, 1936 |
| 2,065,248 | Smith | Dec. 22, 1936 |
| 2,531,440 | Jordan | Nov. 28, 1950 |
| 2,543,741 | Zweifel | Feb. 27, 1951 |
| 2,643,444 | Apel et al. | June 30, 1953 |
| 2,662,057 | McCarthy | Dec. 8, 1953 |
| 2,754,266 | Stegemeier | July 10, 1956 |

OTHER REFERENCES

"Manufacture and Application of Lubricating Greases," Boner-Reinhold Pub. Corp., N.Y. 1954 (p. 777).